Patented Apr. 26, 1927.

1,626,260

UNITED STATES PATENT OFFICE.

PAUL G. WILLETTS, OF WEST HARTFORD, CONNECTICUT, ASSIGNOR TO HARTFORD-EMPIRE COMPANY, OF HARTFORD, CONNECTICUT, A CORPORATION OF DELAWARE.

METHOD OF PRODUCING FIRED CERAMIC BLOCKS.

No Drawing.     Application filed September 23, 1926.   Serial No. 137,388.

My invention relates to the manufacture, by ceramic methods, of refractory blocks such as flux blocks for glass furnaces. Its object is to provide an improved process of controlling the shape of such blocks so that they shall have opposite sides of equal dimensions, notwithstanding a tendency to unequal dimensional changes which results from the method by which the blocks are manufactured.

The present invention is appurtenant to a new system which I have developed for making refractory bodies by ceramic methods. In this system, clays and other selected ingredients are combined in the proper proportions to produce, by chemical rearrangement when the bodies are fired in their final form, a dense, homogeneous and finely grained material, typically consisting of mullite and a small amount of vitreous slag. The temperatures which I employ for firing these bodies frequently exceed 3000° F. At these temperatures the transforming reaction takes place quickly and within a comparatively narrow range of temperature, and the material begins to lose its rigidity to a very slight extent.

These refractories are unusual, not only in their chemical and physical structure but also in the fact that they tend to shrink unequally during the firing operation. Thus when a rectangular block of considerable size, such as 9x9x4 inches, is fired at such high temperature upon an ordinary pallet after being made by the process outlined above, or by any other ceramic process in which the block begins to lose its rigidity during firing, the portion of the block adjacent to the pallet shrinks less than the portions which are further removed from the pallet during the firing operation. Therefore, a block that is perfectly rectangular when placed in the kiln will be substantially smaller at its upper end than at its lower end when the firing is complete, the lower end of the block being locally enlarged or flared outwardly. Such irregular blocks are undesirable for building the walls of glass furnaces and for other uses where the blocks should be laid closely together.

The reduced shrinkage at the bottom of the block appears not to be merely the result of slumping through softening. It may be a result of the frictional resistance to shrinking offered by the support on which the block rests during firing, combined with some slight softening within the body of the block, or it may be due to difference in the absorption of heat by the top and bottom of the block causing chemical conversion of the top and bottom to take place at different stages of shrinkage.

My present invention aims to cause equal shrinkage at the top of such a block and at the bottom of the block on which it rests during firing. To this end, I prepare the blocks in the exact shape which the blocks are to have after firing, with due allowance in size for the firing shrinkage, and I support the blocks for firing upon a support consisting of refractory material that will itself shrink, during firing, at least as much as the blocks themselves. The blocks are then fired in the usual manner, but preferably in one course only, the blocks not being stacked upon one another. After the firing operation they will be found to have shrunk equally at the top and bottom surfaces. The shrinkage of the support avoids any resistance to the shrinkage of the bottom of the block, and if the support shrinks more than the block, there may be an actual compressive stress exerted upon the block by the support.

Numerous materials are suitable for use as the supports for the blocks during firing. For example, such supports may be made of an unburned grog mixture such as I have described in my co-pending application for Letters Patent filed March 1, 1926, Serial No. 91,361. A supporting pallet made from one of the raw mixtures described in my copending application Serial No. 91361 may have a shrinkage of about 7½%, while the blocks, if made according to the disclosure of the same application, may have a shrinkage of about 5%. I prefer to use such a raw mixture or some other material which, after burning, may be broken up and used as grog or otherwise, since such procedure avoids wasting the material of which the supports are composed. If desired, the supports for the blocks may be composed of the same material from which the blocks themselves are made.

Powdered or granular refractory material may be interposed between the supports and the blocks during firing, in order to insure that the blocks will not stick to the supports. Such material may be powdered or crushed alundum, or fired and crushed material similar to the material composing the pallets. The interposed material may or may not shrink during firing.

I am aware that refractory bodies have been stacked upon one another for firing, but in all such cases known to me, such refractory bodies have not been subject to the unequal dimensional changes which tend to occur when the refractory material is brought to such temperature in the kiln that it begins to lose rigidity. Therefore, I consider that such unequal dimensional changes present a new problem, particularly since it has never been the practice heretofore to burn to maturity refractory blocks of substantial size. This invention is also distinguished from prior processes in which blocks have been stacked upon one another for firing, by the fact that each block rests during firing upon a support which is discarded or is used otherwise than as a block, whereas in the ordinary processes, all the blocks are intended for use as such. In carrying out the present invention, the blocks cannot be stacked upon one another for firing, because the lower course or courses of blocks would be deformed as pointed out above, and, in addition, the lower blocks would be deformed still more by the weight of the upper blocks.

I claim as my invention:

1. The method of producing a fired ceramic block having substantially equal opposite faces, from material that tends to shrink unequally during firing, which method comprises placing the block upon a support of material which, during firing, will shrink at least as much as said block, and subjecting the said block and said support to a temperature at which said block tends to shrink unequally.

2. The method of firing a ceramic block that tends to shrink unequally during firing, which method comprises placing the block upon a layer of granular or powdered refractory material on a support of refractory material, which support, during firing, will shrink at least as much as said block, and subjecting said block and said support to a firing temperature sufficient to cause said block to tend to shrink unequally at top and bottom.

3. The method of producing a fired ceramic block having substantially equal opposite faces, from material which, when heated to maturity on a rigid support, tends to shrink less near its lower face than in its upper portions, which method comprises placing the block upon a support of material which, during firing, will shrink at least as much as said block, and subjecting said block and said support to a temperature sufficient to mature said block.

4. The method of producing a fired ceramic block having substantially equal opposite faces, from material which, when heated to maturity on a rigid support, tends to shrink less near its lower face than in its upper portions, which method comprises placing the block upon a layer of granular or powdered refractory material on a support of refractory material, which support, during firing, will shrink at least as much as said block, and subjecting said block and said support to a temperature sufficient to mature said block.

5. The method of manufacturing ceramic blocks, having substantially equal opposite faces, from material which when heated to maturity on a rigid support tends to shrink less near its lower face than in its upper portions, which method comprises the steps of placing the block for firing upon a support composed of material entering into the composition of the said block, which support, during firing, will shrink at least as much as said block, subjecting said block and said support to a temperature at which shrinkage occurs in both the block and support, and thereafter removing the burned block and using the burned support in the manufacture of other similar blocks.

Signed at Hartford, Connecticut, this 22nd day of September, 1926.

PAUL G. WILLETTS.